Webster, Camp & Stall,
Clay Mill,
Nº 42,055. Patented Mar. 22, 1864.
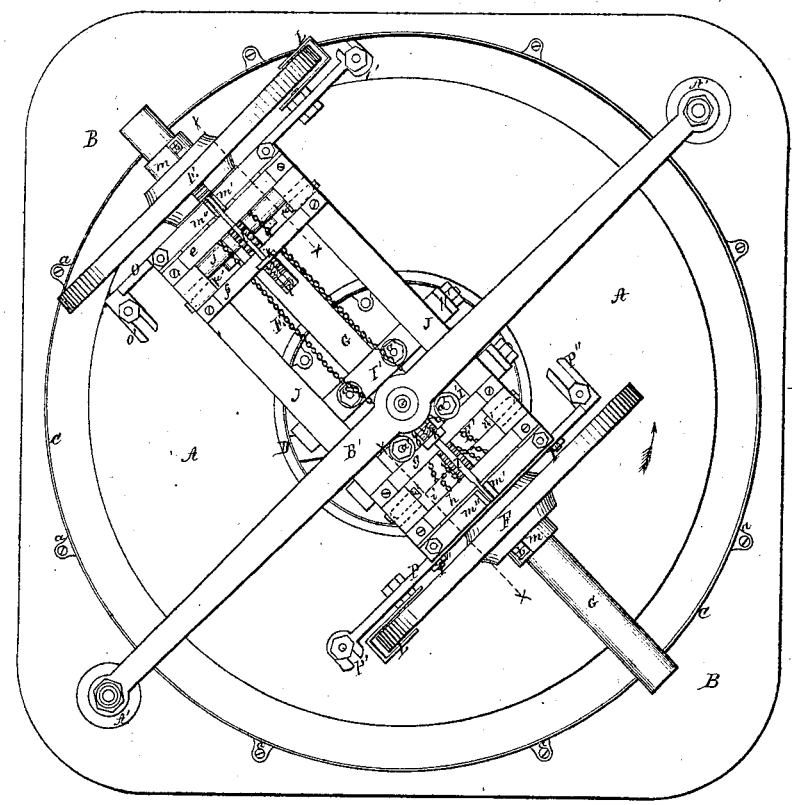
Fig. 1
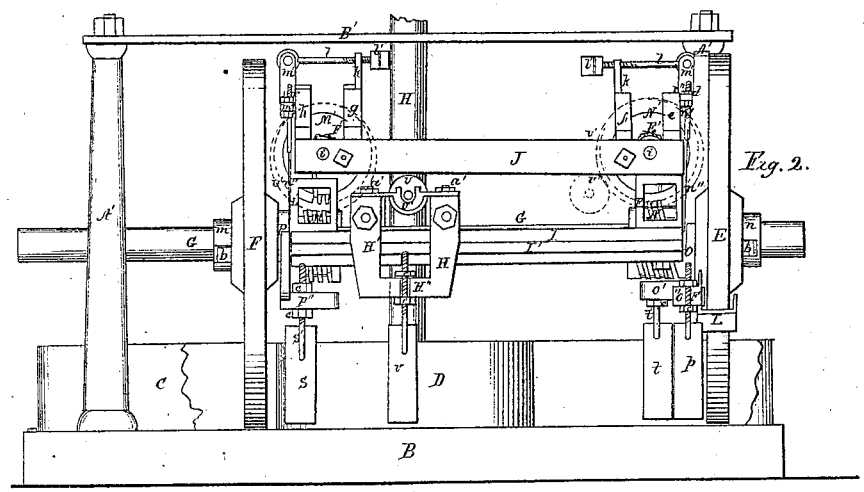
Fig. 2.
Fig. 3.
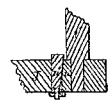
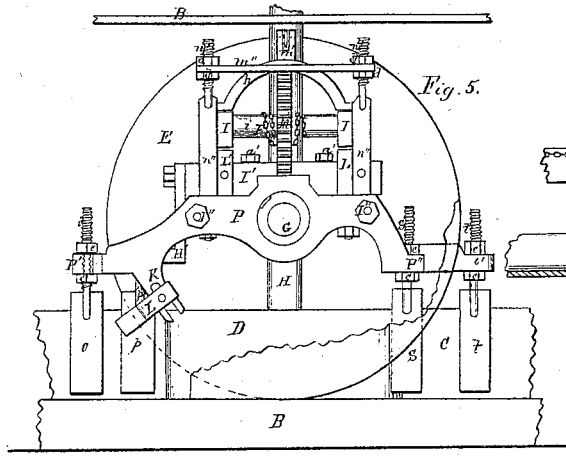
Fig. 5.
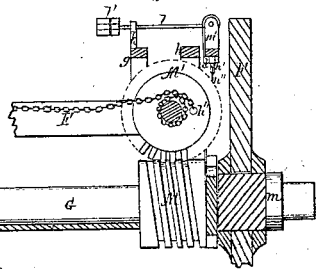
Fig. 4.
Witnesses.
Amos Avery
Wm L. Clarke
Inventors.
Charles Webster
William Camp
G. L. Stall

UNITED STATES PATENT OFFICE.

CHARLES WEBSTER, WILLIAM CAMP, AND S. L. STALL, OF AKRON, OHIO.

IMPROVEMENT IN CLAY-MILLS.

Specification forming part of Letters Patent No. 42,055, dated March 22, 1864.

*To all whom it may concern:*

Be it known that we, C. WEBSTER, W. CAMP, and S. L. STALL, of Akron, in the county of Summit and State of Ohio, have invented certain new and useful Improvements in Clay-Mills; and we do hereby declare that the following is a full and complete description of the construction and operation of the same, reference being had to the accompanying drawings, making a part of this specification, in which—

Figure 1 is a plan view. Fig. 2 is a side view. Figs. 3 and 4 are detached sectional views, Fig. 4 being in the direction of the line $x\ x$ in Fig. 1. Fig. 5 is an end view with one of the wheels broken away.

The same letters of reference denote like parts in the several views.

A represents the bed-plate, which is made of one entire piece and secured to the platform B.

C is the outer curb or rim surrounding the bed-plate, and secured to the platform by lugs $a$ and screws, as shown in Fig. 1.

D is the inner curb, secured in a similar manner to the platform on the inside of the bed.

E and F are the crushing wheels or rollers that revolve on the horizontal shaft G. This shaft is at right angles to the vertical or driving shaft H, where they cross in the center. They are square in form, being firmly secured together, rendering the shaft G stationary, only as it revolves with the machine, being moved round by the revolution of the driving-shaft. It is also secured to a frame-work, I, by bands with nuts $a$ on the top.

I represents the lower, and J the upper, frame-work that supports different parts of the machine.

On the inside of the wheels, around the cylinder or shaft G, are screws M N, which operate the gear-wheels M' N'. Each of these screws has an extension in the form of sleeves $m$ and $n$, which extend through the wheels and are firmly secured to the wheels by the keys $b$.

O and P are yokes on the inside of the wheels, around the sleeves $m\ n$, between the screws and wheels, forming collars to the wheels, the form of which is clearly shown in Fig. 5. These yokes also form bearings, in connection with the support in the center, for the frames I and J, being secured by means of the bars I', Fig. 2, in the lower frame and bolts I'', Fig. 5. The yokes extend down at the ends, as represented, and are formed into slotted arms O' O'' and P' P'', in which the blades $o\ s$ and $t\ p$ are secured and adjusted by means of the screws $o'\ s'\ t'\ p'$ fastened to the blades, and nuts $c$ above and below the arms. With this arrangement the blades can be placed in the slotted arms and secured in any desired position, adjusted either vertically, horizontally, or can be set at any angle. At one side of each of the yokes is a slotted arm, K, Fig. 5, in which the scraper L is secured, that surrounds the edge of the wheel, as shown in Figs. 1 and 2.

A' A' are standards secured to the platform supporting the bridge-tree B', which forms a bearing for the upper end of the driving-shaft H, the lower end of which terminates in a point and step in the center of the inner curb, D. The upper-frame, J, rests on bearings or open corner-blocks L', connected by means of guide-pins or otherwise to the top of the lower frame at each end. (Seen in Figs. 2 and 5.)

$e\ f$ and $g\ h$ are arched braces across the top, secured to each of the horizontal pieces forming the upper frame. At the center of the arched braces $g$ and $f$ extend up arms $k$, through which the gage-rods $l$ pass, with gage-nuts $l'$ on the ends. These gage-rods are connected to the cross-bar $m''$ by a joint at $m'$. The screws $n'$, attached to the top of the springs $n''$, pass through the ends of the cross-bar $m''$, which are adjusted and kept in place by the nuts $d$.

I' I' are cross-pieces, forming part of the lower frame, to the ends of which, on one side, is bolted the yoke H', with the slotted arm H'', in which is secured in a similar manner as described for the other blades the blade V. This blade comes down and moves round on the outside of the inner curb. Between the pieces I', directly under the upper frame, are arranged rollers U, having bearings in the boxes U', that are bolted to the frame, as represented in Fig. 2. The shafts $i\ j$, of the gear-wheels M' N', to which they are secured, have their bearings in the upper frame, J, and on one side of each journal in the frame is a friction-box, $u$, and key $u'$, with a nut and screw on one end, (shown in Fig. 3, and indicated by the dotted lines in Fig. 1,) by means of which the friction can be increased on the journals of the shafts, giving tension to the chains while they are unwinding.

E' and F' are the chains, each of which passes through a hole, $h'$, in the gear-wheels, around the shafts $i\, j$, extending along to the center, around the driving-shaft, where they are kept in place and prevented from slipping down on the shaft by a pin underneath them.

The manner in which this machine operates is as follows: The power is applied to the driving-shaft H, which causes the entire machine to move round in the direction of the arrows in Fig. 1, and as the machine is moved round, by turning the driving-shaft, the friction of the clay and bed plate revolve the crushing-wheels E and F. The screws M N, with the sleeves $m\, n$, being secured to the wheels, as before described, turn with them, which operates the gear-wheels M' N', winding and unwinding the chains on the shafts, which moves the rollers E and F along the horizontal shaft laterally, the frame and all parts of the machine, excepting the cross-pieces I', moving with them. When the chain F' is wound up on the shaft of the gear M', the machine is in the position shown in Figs. 1 and 2. The wheel F and that end of the machine being moved up so close to the driving-shaft, the gage-nuts $l'$ come against the shaft, when, by means of the gage-rods $l$ and springs $n''$, the yoke $m''$ is forced back, removing the catch $r$ from the top of the brace $h$, when the rollers U, underneath that end of the frame, elevate it, raising the gear M' above the screw or out of gear. The frame oscillating or balancing on the rollers U, which act as fulcrums, the other end being so much longer and heavier, it falls by its own weight into gear, as represented, when the springs $n''$ at that end cause the catch $r''$ to pass on to the brace $e$, which will keep it in gear until the chain E' is wound up. Thus alternately the gears are thrown in and out of gear, causing the lateral movement of the machine. The gears M' N', the frame, and roller U, will be in the position in relation to each other as indicated by the dotted lines U'' in Fig. 2, and the roller E will be moved up near the center. In this way the crushing wheels or rollers are made to move back and forth simultaneously with revolving and moving round with the machine. By means of the friction-boxes and keys $u''$ the pressure is adjusted on the journals of the shafts of the gear-wheels, giving the proper tension to the chains, preventing any sudden starts in the lateral movement of the rollers. Thus the wheels or rollers in their operation have a compound reciprocating and rotary movement, grinding most effectually and uniformly all the clay on the bed-plate.

It is found in practical operation that this mill has many advantages over those in ordinary use. The solid bed-plate A prevents the clay from working into the joints, which is the result when the bed-plate is made up of sections, and a solid bed-plate being so much more firm, it facilitates the work and is not so liable to get out of repair, and it is not so expensive in its construction. The solid bed-plate, also, may be turned over and the under side used, which cannot be done with a sectional bed-plate, the peculiar construction of the yokes O P, forming collars to the wheels and supports to the frames, and the manner in which the scrapers are attached to them, and the blades being so arranged with nuts and screws that they can readily be raised or lowered or adjusted to any desired position. The wheels being made alike on both sides, and keyed to the sleeves $m\, n$, as described, they are rendered reversible, and can readily be taken off and turned, as is required, for the reason that the outer edge of the wheels wears off by friction more rapidly than the inner edge; but by reversing them they can be worn off uniformly, avoiding the necessity of having them taken from the mill, turned down, and banded, to make the peripheries parallel to the bed-plate, which has to be done with crushing-wheels in ordinary use that cannot be reversed.

What we claim as our improvement, and desire to secure by Letters Patent, is—

1. The application of the entire solid bed-plate A, in combination with the reversible crushing-rollers E and F, when arranged and operating in the manner and for the purpose set forth.

2. The yokes O P and adjustable blades or scrapers, arranged substantially as set forth, in combination with a clay-mill, for the purpose specified.

3. The combination of the friction-box $u$ and key $u'$, provided with a nut and screw, when arranged and applied to the purpose described.

4. The adjustable gage-rods $l$ and the open corner-blocks L', in combination with the cross-bar $m''$ and springs $n''$, substantially as set forth.

CHARLES WEBSTER.
WILLIAM CAMP.
S. L. STALL.

Witnesses:
AMOS AVERY,
WM. L. CLARK.